(12) United States Patent
Hoshino

(10) Patent No.: US 11,424,631 B2
(45) Date of Patent: Aug. 23, 2022

(54) CHARGING STAND FOR CARE APPARATUS THAT PREVENTS CORROSION OF TERMINALS

(71) Applicant: PANASONIC INTELLECTUAL PROPERTY MANAGEMENT CO., LTD., Osaka (JP)

(72) Inventor: Junichi Hoshino, Shiga (JP)

(73) Assignee: PANASONIC INTRLLECTUAL PROPERTY MANAGEMENT CO., LTD., Osaka (JP)

( * ) Notice: Subject to any disclaimer, the term of this patent is extended or adjusted under 35 U.S.C. 154(b) by 400 days.

(21) Appl. No.: 16/737,743

(22) Filed: Jan. 8, 2020

(65) Prior Publication Data
US 2020/0244084 A1  Jul. 30, 2020

(30) Foreign Application Priority Data

Jan. 30, 2019  (JP) .............................. JP2019-014752

(51) Int. Cl.
*H01M 10/46* (2006.01)
*H02J 7/00* (2006.01)
(Continued)

(52) U.S. Cl.
CPC ........ *H02J 7/0044* (2013.01); *A61C 17/0202* (2013.01); *A61C 17/16* (2013.01); *A61C 2204/002* (2013.01)

(58) Field of Classification Search
CPC ... H02J 7/0044; H02J 7/0042; A61C 17/0202; A61C 17/16; A61C 2204/002; A61C 17/224
(Continued)

(56) References Cited

U.S. PATENT DOCUMENTS 3,379,952 A    4/1968 Tarrson
3,533,119 A *  10/1970 Dokos ................ A61C 17/3418
                                                74/45
(Continued)

FOREIGN PATENT DOCUMENTS

CA    2043666 A1 * 12/1991 ............. A61C 17/34
EP    1314401 A1 *  5/2003 ............. A61C 17/22
(Continued)

OTHER PUBLICATIONS

The Extended European Search Report dated Apr. 14, 2020 for the related European Patent Application No. 20152209.1.

*Primary Examiner* — Edward Tso
(74) *Attorney, Agent, or Firm* — McDermott Will & Emery LLP

(57) ABSTRACT

The charging stand for a care apparatus according to the present disclosure includes a fifth terminal connected to a first terminal, a sixth terminal aligned with the fifth terminal and electrically connected to a second terminal, a first cover having a cylindrical shape that stores the first terminal, a second cover having a cylindrical shape that stores the second terminal, a fifth cover having a cylindrical shape that stores the fifth terminal, and a sixth cover having a cylindrical shape that stores the sixth terminal. A shape of an input connecting portion formed by the fifth cover and the sixth cover is different from a shape of an output connecting portion formed by the first cover and the second cover.

7 Claims, 6 Drawing Sheets

(51) Int. Cl.
*A61C 17/02* (2006.01)
*A61C 17/16* (2006.01)

(58) Field of Classification Search
USPC .......................................... 320/107, 114, 115
See application file for complete search history.

(56) References Cited

U.S. PATENT DOCUMENTS 3,536,981 A   10/1970  Locke et al.
2012/0279516 A1  11/2012  Bouix et al.

FOREIGN PATENT DOCUMENTS

| | | | | |
|---|---|---|---|---|
| GB | 2157509 A | * | 10/1985 | ............. H01R 23/10 |
| JP | 48-043688 B1 | | 12/1973 | |
| JP | S62-123666 A | | 6/1987 | |
| WO | WO-9953562 A1 | * | 10/1999 | ........... A61C 17/224 |

* cited by examiner

CHARGING STAND FOR CARE APPARATUS THAT PREVENTS CORROSION OF TERMINALS

CROSS-REFERENCE OF RELATED APPLICATIONS

This application claims the benefit of Japanese Application No. 2019-014752, filed on Jan. 30, 2019, the entire disclosure of which Application is incorporated by reference herein.

BACKGROUND

1. Technical Field

The present disclosure relates to a charging stand for a care apparatus, the charging stand holding a care apparatus that cares for a human body or an animal such as an oral washer, a shaver, hair clippers, and a facial equipment and being electrically connected to the care apparatus.

2. Description of the Related Art

As an example of a conventional charging stand for a care apparatus, a charging stand that supplies power while holding a rechargeable electric toothbrush can be exemplified. The charging stand described in Unexamined Japanese Patent Publication No. 62-123666 includes a connecting portion having a structure that can prevent a connection terminal from corroding due to water attached to the charging stand when the charging stand holds the electric toothbrush.

SUMMARY

Regarding corrosion of the connection terminal due to water, a connecting portion between a commercial power supply and the charging stand has a same problem. Therefore, from a viewpoint of water repellence, the connecting portion between the commercial power supply and the charging stand desirably has a same configuration as the connecting portion between the care apparatus and the charging stand. However, when the same configuration is applied, the power supply source can be directly connected to the care apparatus from the commercial power supply, and thus a failure of the care apparatus may be caused.

An object of the present disclosure is to provide a charging stand that can prevent corrosion of a terminal for connection and prevent a direct connection between the care apparatus and a commercial power supply.

In order to achieve the object described above, the charging stand for a care apparatus according to the present disclosure is a charging stand for a care apparatus that includes a first terminal and a second terminal, and supplies power to the care apparatus through connection between the first terminal and a third terminal that is at least partially stored in a third cover included in the care apparatus, and the second terminal and a fourth terminal that is at least partially stored in a fourth cover included in the care apparatus, the charging stand including: a fifth terminal that is electrically connected to the first terminal; a sixth terminal that is aligned with the fifth terminal and is electrically connected to the second terminal; a first cover having a tubular shape that stores at least a part of the first terminal; a second cover having a tubular shape that stores at least a part of the second terminal; a fifth cover having a tubular shape that stores at least a part of the fifth terminal; and a sixth cover having a tubular shape that stores at least a part of the sixth terminal, in which a shape of an input connecting portion formed by the fifth cover and the sixth cover is a shape connectable to a power supply connecting portion, and is different from a shape of an output connecting portion formed by the first cover and the second cover.

According to the present disclosure, a charging stand for a care apparatus can be provided that prevents corrosion of a terminal for connection in both a connecting portion with the care apparatus and a connecting portion with a commercial power supply, and prevents direct connection between the care apparatus and the commercial power supply.

DETAILED DESCRIPTION

Hereinafter, a care unit according to an exemplary embodiment of the present disclosure will be described in detail with reference to the drawings. The exemplary embodiment described below is a preferred specific example of the present disclosure. Therefore, numeric values, shapes, materials, constituents, dispositions and connection modes of the constituents, and the like, which are shown in the following exemplary embodiment, are merely examples, and are not intended to limit the present disclosure. Accordingly, among the constituents in the following exemplary embodiment, constituents which are not recited in the independent claim for the most generic concept of the present disclosure are described as arbitrary constituents.

The drawings are also schematic views, and are not always exactly illustrated. In the respective drawings, identical components are denoted by identical reference symbols.

Figure 1:
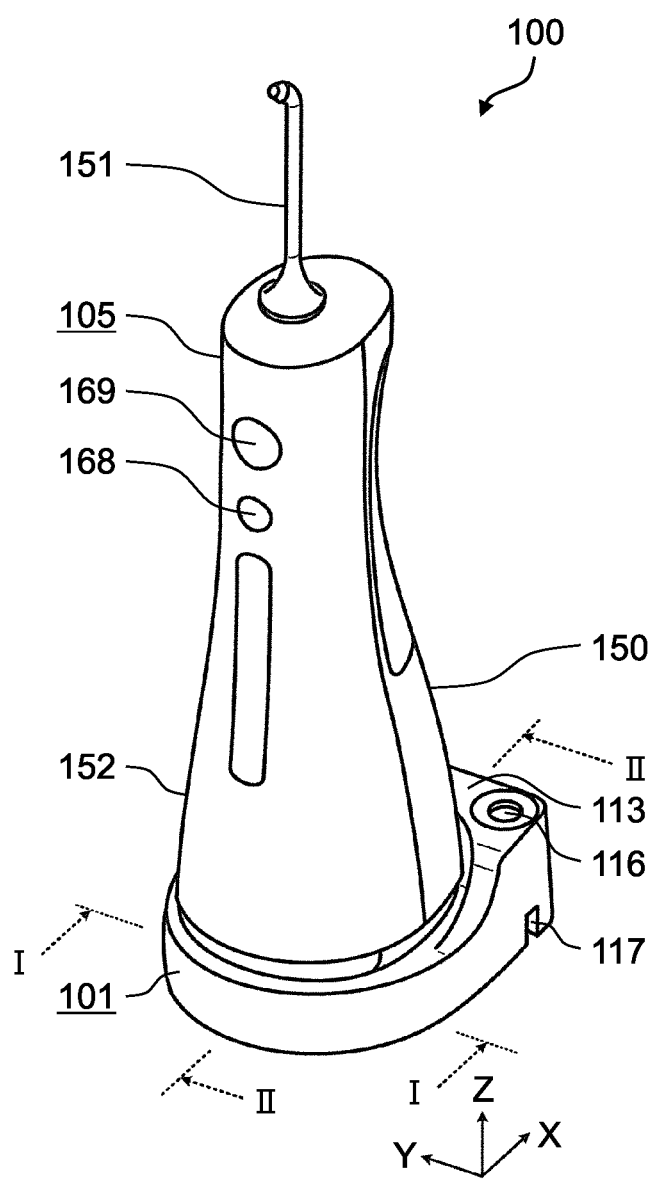
FIG. 1 is a perspective view showing a care unit including a charging stand and a care apparatus according to an exemplary embodiment.

FIG. 1 is a perspective view showing a care unit including a charging stand and a care apparatus according to an exemplary embodiment. As shown in FIG. 1, care unit 100 includes charging stand 101 for a care apparatus and care apparatus 105.

Figure 2:
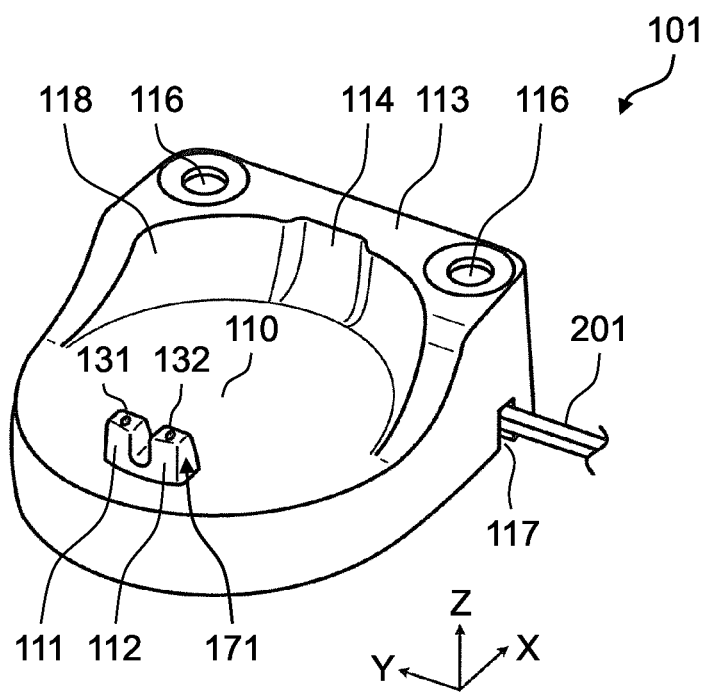
FIG. 2 is a perspective view showing the charging stand for the care apparatus according to the exemplary embodiment from a top.

As shown in FIG. 2, charging stand 101 includes first connecting portion 171 for charging care apparatus 105. First connecting portion 171 is formed into a projection and is provided on holding surface 110 described later. First connecting portion 171 includes first cover 111, second cover 112, first terminal 121, and second terminal 122. A space in which first partition wall 162 described later is fitted is provided between first cover 111 and second cover 112.

Figure 4:
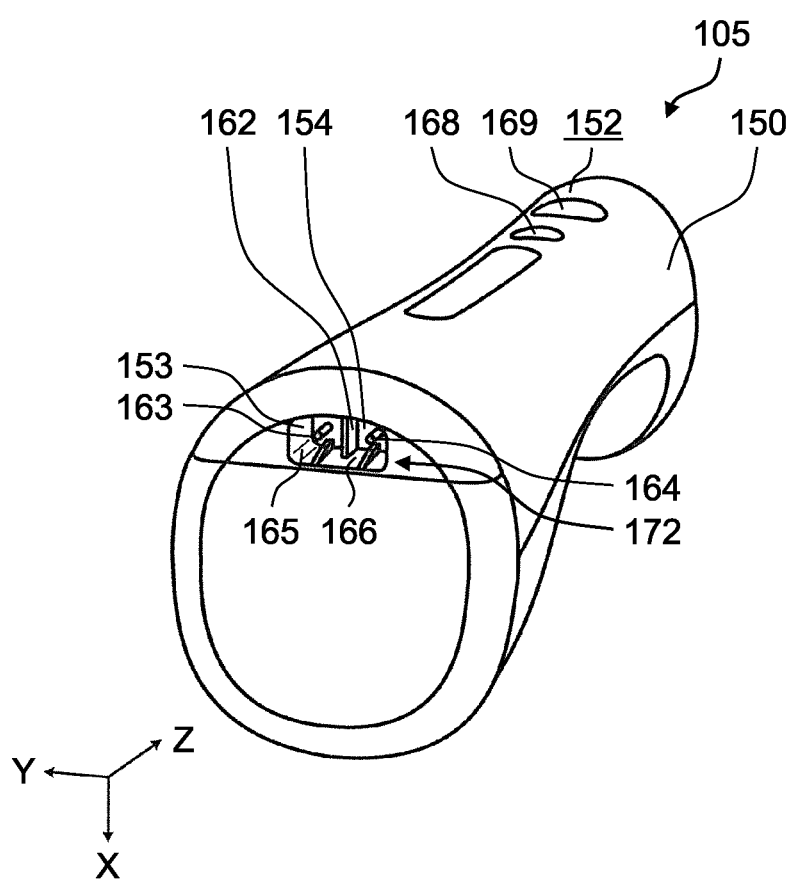
FIG. 4 is a perspective view showing the care apparatus according to the exemplary embodiment from a bottom.

As shown in FIG. 4, care apparatus 105 includes second connecting portion 172 that is connected to first connecting portion 171 of the charging stand. Second connecting portion 172 is formed into a recess at the bottom of care apparatus 105. Second connecting portion 172 includes third cover 153, fourth cover 154, third terminal 163, fourth terminal 164, and first partition wall 162.

Figure 3:
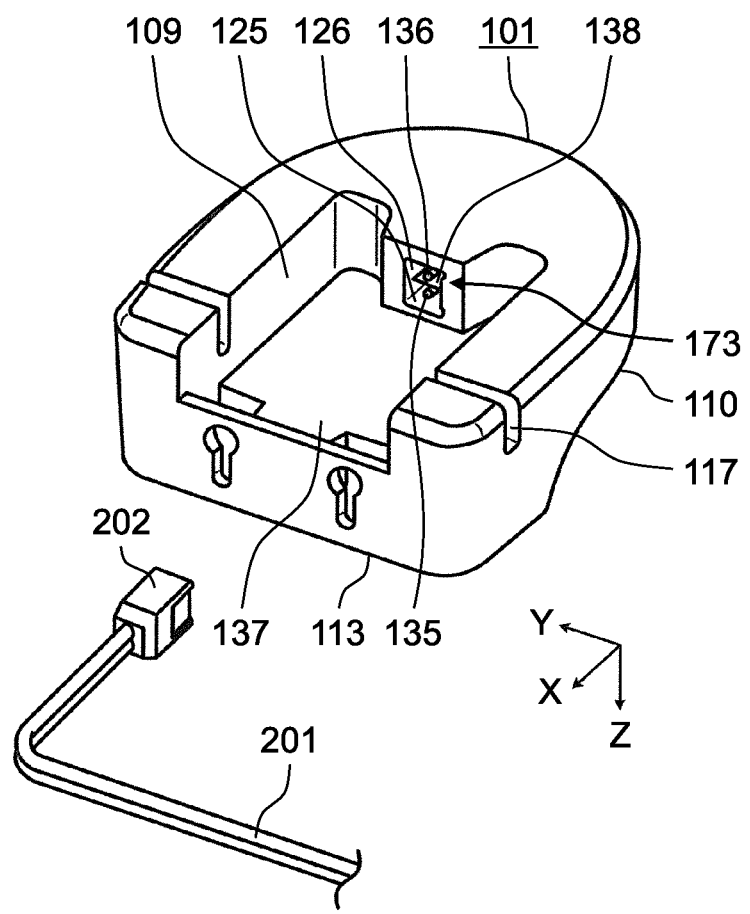
FIG. 3 is a perspective view showing the charging stand for the care apparatus according to the exemplary embodiment from a bottom.

In addition, as shown in FIG. 3, charging stand 101 includes third connecting portion 173, to which power supply connecting portion 202 provided at an end of power supply cable 201 is connected. Third connecting portion 173 includes fifth cover 125, sixth cover 126, fifth terminal 135, sixth terminal 136, and second partition wall 138. Third connecting portion 173 described above is electrically conducted to first connecting portion 171. Moreover, third connecting portion 173 is formed into a shape not identical to second connecting portion 172. Accordingly, an erroneous direct connection of power supply connecting portion 202 with second connecting portion 172 can be prevented. As a result, a possibility of a failure of care apparatus 105 due to an erroneous connection can be reduced.

Note that the shapes of a recess and a projection of first connecting portion 171 and second connecting portion 172 can be reversed. However, second connecting portion 172 is desirably recessed. This is because care apparatus 105 is stable when being placed on a place other than the charging stand.

Power supply cable 201 includes a fourth connecting portion (power supply connecting portion 202) that is connected to third connecting portion 173 at one end of power supply cable 201. In addition, at another end, power supply cable 201 includes a fifth connecting portion (not shown) that is connected to an outlet of a commercial power supply. Note that power supply cable 201 may be included in care unit 100 together with charging stand 101 for a care apparatus and care apparatus 105.

FIG. 2 is a perspective view showing the charging stand for the care apparatus according to the exemplary embodiment from a top. FIG. 3 is a perspective view showing the charging stand for the care apparatus according to the exemplary embodiment from a bottom. As shown in FIG. 1, charging stand 101 is an apparatus that holds care apparatus 105 so as to be electrically connected to care apparatus 105 and supply power to a storage battery included in care apparatus 105. Charging stand 101 includes a function that relays power supplied by power supply cable 201 to care apparatus 105 through a connection with power supply connecting portion 202 (see FIG. 3) and a function that holds care apparatus 105. In a case of the present exemplary embodiment, charging stand 101 holds care apparatus 105 that is placed on top of holding surface 110. Charging stand 101 includes first cover 111, second cover 112, fifth cover 125, and sixth cover 126. In addition, charging stand 101 includes guide 113 and rotation regulating portion 114. In the case of the present exemplary embodiment, charging stand 101 includes nozzle holder 116 that holds nozzle 151 (see FIG. 1) to be attached to care apparatus 105 in two places, and cable opening 117, through which power supply cable 201 that is connected to a commercial power supply is passed.

First cover 111 is a portion having a tubular shape that includes first opening 131, into which third terminal 163 (described later) that is a connection terminal is inserted, and stores first terminal 121 (described later) that is electrically connected to third terminal 163. Second cover 112 is a portion having a tubular shape that includes second opening 132, into which fourth terminal 164 (described later) that is a connection terminal is inserted, and stores at least a part of second terminal 122. Fifth cover 125 is a portion having a tubular shape that is fitted in a part of power supply connecting portion 202 and stores at least a part of fifth terminal 135. Sixth cover 126 is a portion having a tubular shape that is fitted in another part of power supply connecting portion 202 and stores at least a part of sixth terminal 136. Note that, as shown in FIG. 3, a tubular shape includes a shape in which a part of a peripheral wall is cut away. Details of first cover 111, second cover 112, fifth cover 125, and sixth cover 126, and first terminal 121, second terminal 122, fifth terminal 135, and sixth terminal 136 that are not shown in FIGS. 1 and 2 will be described later.

Guide 113 is a portion for holding care apparatus 105 in a predetermined position of charging stand 101. A specific shape of guide 113 is not particularly limited. Any shape may be applied as long as the shape guides a move of care apparatus 105 with respect to charging stand 101 when care apparatus 105 is held on charging stand 101. In the case of the present exemplary embodiment, guide 113 is a portion protruding from holding surface 110 of charging stand 101 in an erected manner, and includes wall surface 118 that is curved along a part of a shape of a peripheral bottom of care apparatus 105.

Rotation regulating portion 114 is a portion that regulates displacement of care apparatus 105 with respect to charging stand 101 in a rotation direction when care apparatus 105 is going to be attached or has been attached to charging stand 101. Here, the rotation direction of care apparatus 105 with respect to charging stand 101 is a direction whose axis of rotation is a direction of attaching care apparatus 105 to charging stand 101 (Z-axis direction in the drawing). In the case of the present exemplary embodiment, rotation regulating portion 114 is a portion having a groove shape that extends in the Z-axis direction in the drawing and is recessed from wall surface 118 in an X-axis direction orthogonal to the Z-axis direction, and a portion into which a rotation regulated portion (not shown) is fitted, the rotation regulated portion provided at the bottom of care unit 100 and protruding in a radial direction.

Note that a material or a manufacturing method of charging stand 101 is not particularly limited. In the case of the present exemplary embodiment, charging stand 101 is a resin mold formed so as to have a predetermined thickness.

According to charging stand 101 described above, when care apparatus 105 is placed on charging stand 101, the rotation regulated portion of care apparatus 105 is fitted into rotation regulating portion 114, and care apparatus 105 is placed on holding surface 110 while the bottom of care apparatus 105 is disposed along wall surface 118. In the manner described above, third cover 153 and fourth cover 154 (see FIG. 4) provided at the bottom of care apparatus 105 can be easily inserted into first cover 111 and second cover 112, respectively. Moreover, the position of care apparatus 105 on holding surface 110 is determined while care apparatus 105 is placed on holding surface 110. Therefore, positional relationships of first cover 111 and second cover 112 with respect to third cover 153 and fourth cover 154, respectively, are determined.

FIG. 4 is a perspective view showing the care apparatus according to the exemplary embodiment from a bottom.

Figure 5:
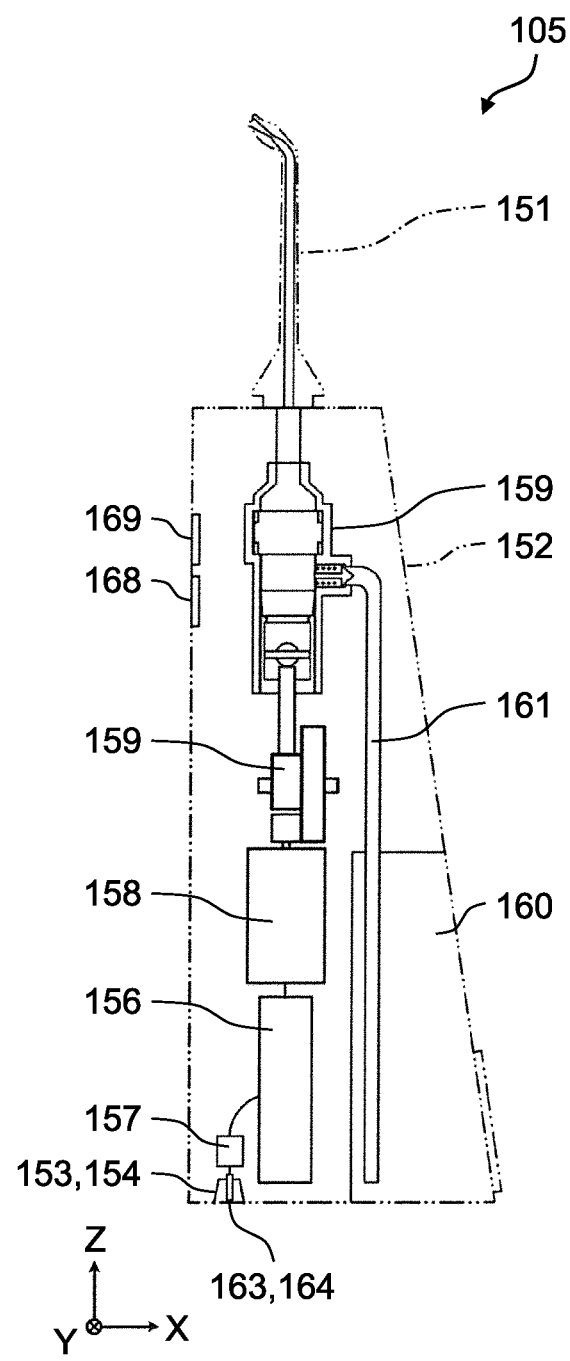
FIG. 5 is a view schematically showing an inner structure of the care apparatus according to the exemplary embodiment from a side.

FIG. 5 is a view schematically showing an inner structure of the care apparatus according to the exemplary embodiment from a side.

Care apparatus 105 is an apparatus that cares for an inside of a month or hair of a person or an animal by power of a storage battery. In the case of the present exemplary embodiment, an oral washer is exemplified as care apparatus 105. As shown in FIG. 1, care apparatus 105 is a compact apparatus that can be held with one hand of a person, and includes nozzle 151 and apparatus body 152.

Nozzle 151 is a member that includes a discharge port that discharges a liquid between teeth, and is detachably attached to an upper end of apparatus body 152. Nozzle 151 forms a passage through which a liquid such as water whose pressure has been increased by apparatus body 152 is discharged in a predetermined direction. The passage of the liquid formed by nozzle 151 has a Venturi structure, and decreases the pressure to a saturated steam pressure by increasing a flow velocity of the liquid. Accordingly, a part of the liquid is changed into a gas, and thus bubbles are generated in the liquid. In addition, the passage changes the babbles into a liquid by gradually recovering the pressure of the liquid so that the pressure of the liquid is restored to be equal to or more than the saturated steam pressure. At this time, the bubbles burst and thus high shock waves are momentarily generated. These shock waves can be used for removal of a dirt inside the mouth, particularly a dirt between teeth.

Apparatus body 152 is an apparatus that discharges a liquid through nozzle 151, and includes apparatus housing 150 having a substantially cylindrical shape when viewed as a whole that can be easily held with one hand of a person. Since apparatus housing 150 is caught in an edge of a palm of a hand that holds apparatus housing 150, a burden on an arm due to a weight of care apparatus 105 can be reduced. Apparatus body 152 includes third cover 153, fourth cover 154 (see FIG. 4), third terminal 163, and fourth terminal 164 at the bottom of apparatus housing 150. In addition, as shown in FIG. 5, apparatus body 152 includes storage battery 156, power storage controller 157, driving source 158, pressure raising discharge mechanism 159, tank 160, and tube 161 inside. Note that third cover 153, fourth cover 154, third terminal 163, and fourth terminal 164 will be described later together with first cover 111, second cover 112, first terminal 121, and second terminal 122.

Storage battery 156 is a secondary battery that can store power by being supplied with power and can supply the stored power to driving source 158 and the like. A type of storage battery 156 is not particularly limited. A lithium ion battery and the like can be exemplified.

Power storage controller 157 is a circuit that monitors a power storage amount of storage battery 156 and can block a supply of power to storage battery 156 when storage battery 156 is fully charged. Note that power storage controller 157 does not have to be included in care apparatus 105.

Driving source 158 is an apparatus that generates driving force for driving pressure raising discharge mechanism 159. Driving source 158 is not particularly limited. An electric motor and the like can be exemplified.

Pressure raising discharge mechanism 159 is a mechanism that lifts a liquid in tank 160 through tube 161, increases the pressure of the lifted liquid to a predetermined pressure, and then discharges the liquid. Pressure raising discharge mechanism 159 is not particularly limited. A mechanism can be exemplified that lifts a liquid, increases a pressure, and discharges the liquid through using of a piston that is caused to reciprocate by driving source 158 and a combination of a plurality of valves.

In addition, a front of apparatus body 152 is provided with power button 169 and adjustment button 168 for adjusting the pressure of the liquid discharged from nozzle 151. Power button 169, adjustment button 168 and the like are electrically connected to a controller that is not shown. The controller is, for example, a microcomputer and is incorporated in apparatus body 152.

A user who holds apparatus body 152 with nozzle 151 attached disposes a tip end of nozzle 151 near an area between teeth and operates power button 169 so as to discharge the liquid to the area between the teeth and care for the inside of the mouth.

Figure 6:
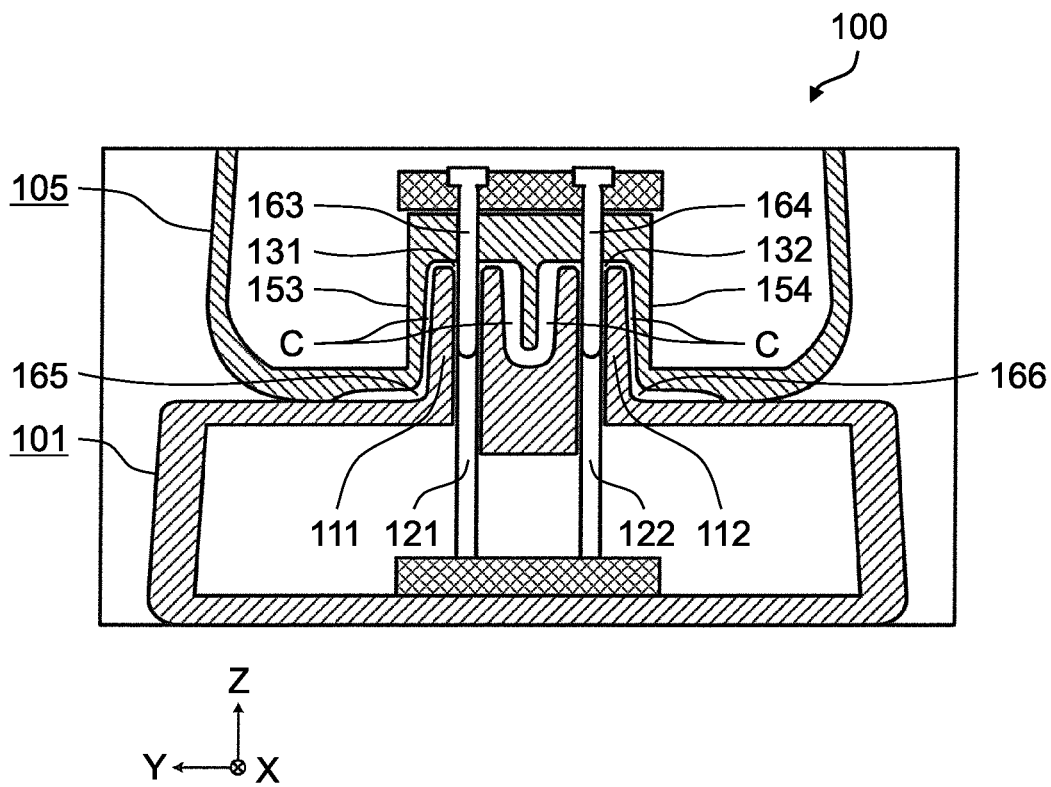
FIG. 6 is a sectional view taken along line I-I in FIG. 1 showing a terminal portion of the care unit when the care apparatus is attached to the charging stand for the care apparatus.
Figure 7:
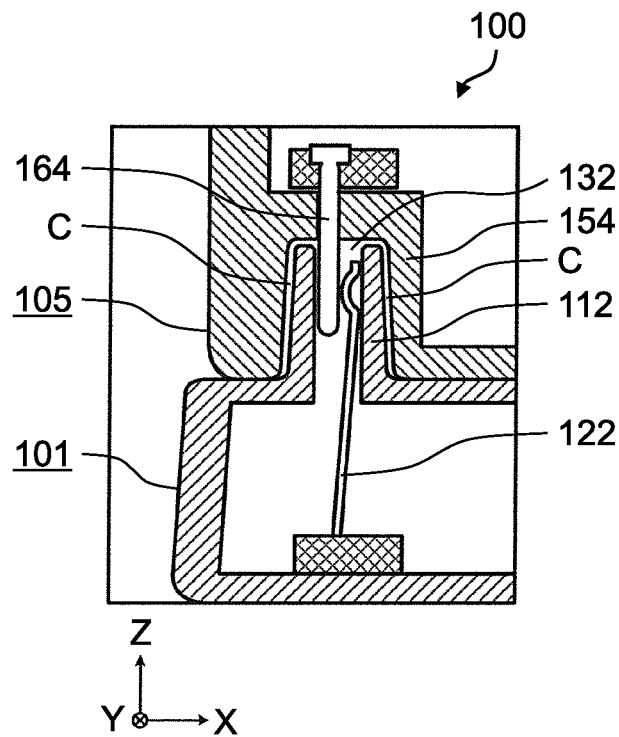
FIG. 7 is a sectional view taken along line II-II in FIG. 1 showing the terminal portion of the care unit when the care apparatus is attached to the charging stand for the care apparatus.

FIG. 6 is a sectional view taken along line I-I in FIG. 1 showing a terminal portion of the care unit when the care apparatus is attached to the charging stand for the care apparatus. FIG. 7 is a sectional view taken along line II-II in FIG. 1 showing the terminal portion of the care unit when the care apparatus is attached to the charging stand for the care apparatus. In the case of the present exemplary embodiment, charging stand 101 includes first terminal 121, second terminal 122, first cover 111, and second cover 112 Care apparatus 105 includes third terminal 163, fourth terminal 164, third cover 153, and fourth cover 154.

First terminal 121 and second terminal 122 are connection terminals that are electrically connected to third terminal 163 and fourth terminal 164, respectively, and supply power transmitted through power supply cable 201 to care apparatus 105. In the case of the present exemplary embodiment, the power supplied through power supply cable 201 is a direct-current voltage suitable to charge storage battery 156, and first terminal 121 and second terminal 122 each are electrically connected to power supply cable 201.

First terminal 121 is electrically connected to third terminal 163 with a unidirectional biasing force only, and second terminal 122 is electrically connected to fourth terminal 164 with a unidirectional biasing force only. A generation source of the biasing force is not particularly limited. For example, a biasing member such as a rubber or a spring that biases first terminal 121 and second terminal 122 separately or integrally may be included. In the case of the present exemplary embodiment, first terminal 121 and second terminal 122 are formed of a material having an elastic force such as spring steel, and the elastic forces of first terminal 121 and second terminal 122 enable first terminal 121 and second terminal 122 to connect to third terminal 163 and fourth terminal 164, respectively.

In the case of the present exemplary embodiment, an axis of a biasing direction of first terminal 121 is parallel to an axis of a biasing direction of second terminal 122. Specifically, the axis of the biasing direction of first terminal 121 and the axis of the biasing direction of second terminal 122 are parallel to an axis of a direction extending from an end of charging stand 101 where guide 113 is provided toward an end of an opposite side (X-axis in the drawing). In addition, the biasing direction of first terminal 121 extends from the end where guide 113 is provided toward the end of the opposite side (negative direction of the X-axis in the drawing). The biasing direction of second terminal 122 is a same direction as the biasing direction of first terminal 121.

A shape of first terminal 121 and a shape of second terminal 122 are identical, and same parts can be used for first terminal 121 and second terminal 122.

As shown in FIG. 6, first cover 111 is a portion having a tubular shape that includes first opening 131, into which third terminal 163 is inserted, and stores first terminal 121.

Second cover 112 is a portion having a tubular shape that includes second opening 132, into which fourth terminal 164 is inserted, and stores second terminal 122.

In the case of the present exemplary embodiment, first cover 111 and second cover 112 each are a portion that protrudes from holding surface 110 toward a side of care apparatus 105 that is held. First cover 111 and second cover 112 are disposed side by side in a direction orthogonal to the biasing direction of first terminal 121 and second terminal 122. An outer shape of first cover 111 and an outer shape of second cover 112 each are a quadrangular pyramid that tapers from holding surface 110 toward a protruding direction (positive direction of the Z-axis direction in the drawing). Vicinities of first cover 111 and second cover 112 on holding surfaces 110 are connected to each other. First cover 111 and second cover 112 form a shape of an output connecting portion.

As described above, first cover 111 and second cover 112 each has a shape protruding upward from holding surface 110. Therefore, even when a liquid such as water is attached to the vicinities of first cover 111 and second cover 112, the liquid can be easily discharged without remaining. Moreover, a skirt of first cover 111 and a skirt of second cover 112 are connected to each other. Therefore, the liquid attached to first cover 111 and second cover 112 can be early discharged. As a result, a short circuit of first terminal 121 with second terminal 122 or fourth terminal 164, a short circuit of second terminal 122 with third terminal 163 and the like due to the liquid can be prevented.

In the case of the present exemplary embodiment, the shape of each of first opening 131 and second opening 132 provided on a top surface of first cover 111 and a top surface of second cover 112, respectively, is not a perfect circle. Two adjacent sides of each of a bounding rectangle of first opening 131 and a bounding rectangle of second opening 132 are different in length. Here, a bounding rectangle refers to a smallest rectangle that can surround a contour. Specifically, the shape of each of first opening 131 and second opening 132 is an oval shape including an oblong shape and an elliptical shape. First opening 131 and second opening 132 are disposed so that longitudinal directions of first opening 131 and second opening 132 are parallel to the biasing directions of first terminal 121 and second terminal 122, respectively.

While care apparatus 105 is held in the predetermined position of charging stand 101, sizes of first opening 131 and second opening 132 are set so that there is a gap between third terminal 163 and fourth terminal 164 that have been inserted. Note that in a case where the position in which care apparatus 105 is held with respect to charging stand 101 is displaced from the predetermined position, at least one of a pair of first opening 131 and third terminal 163, and a pair of second opening 132 and fourth terminal 164 may come into contact with each other.

Third terminal 163 is a connection terminal that is detachably and electrically connected to first terminal 121. Fourth terminal 164 is a connection terminal that is detachably and electrically connected to second terminal 122. In the case of the present exemplary embodiment, third terminal 163 and fourth terminal 164 are connected to storage battery 156 through power storage controller 157, and supply power relayed by charging stand 101 to storage battery 156.

Third terminal 163 and fourth terminal 164 each are a rod-shaped member having rigidity that can maintain the shape against the biasing force of each of first terminal 121 and second terminal 122. In the case of the present exemplary embodiment, third terminal 163 and fourth terminal 164 each are a round rod Third cover 153 is a portion having a tubular shape that includes third opening 165, into which first cover 111 is inserted, and stores at least a part of third terminal 163. Fourth cover 154 is a portion having a tubular shape that includes fourth opening 166, into which second cover 112 is inserted, and stores at least a part of fourth terminal 164.

In the case of the present exemplary embodiment, third cover 153 and fourth cover 154 each are a portion recessed inward from the bottom of care apparatus 105. Third cover 153 and fourth cover 154 are disposed side by side in the direction orthogonal to the biasing directions of first terminal 121 and second terminal 122. An inner shape of third cover 153 and an inner shape of fourth cover 154 correspond to the outer shape of first cover 111 and the outer shape of second cover 112, respectively, and each are a quadrangular pyramid that tapers inward from the bottom (positive direction of the Z-axis direction in the drawing). Wall surfaces of third cover 153 and fourth cover 154 are partially shared, and a shared portion of the wall surfaces separates, as first partition wall 162, third terminal 163 from fourth terminal 164.

In the case of the present exemplary embodiment, third terminal 163 and fourth terminal 164 are attached to ceiling surfaces of third cover 153 and fourth cover 154, respectively, in a protruded manner.

While care apparatus 105 is held in the predetermined position of charging stand 101, the sizes of the outer shape of first cover 111, the outer shape of second cover 112, the inner shape of third cover 153, and the inner shape of fourth cover 154 are set so that, in a radial direction orthogonal to an insertion direction of first cover 111, an entire periphery of third cover 153 is not in contact with an entire periphery of first cover 111, and in a radial direction orthogonal to an insertion direction of second cover 112, an entire periphery of fourth cover 154 is not in contact with an entire periphery of second cover 112. That is, while care apparatus 105 is held in the predetermined position of charging stand 101, gap C exists between first cover 111 and third cover 153, and between second cover 112 and fourth cover 154 (see FIG. 6).

Note that in the case where the position in which care apparatus 105 is held with respect to charging stand 101 is displaced from the predetermined position, at least one of a pair of first cover 111 and third cover 153, and a pair of second cover 112 and fourth cover 154 may come into contact with each other.

According to the configuration described above, when care apparatus 105 is attached to or detached from charging stand 101, in particular, when care apparatus 105 is removed from charging stand 101, first cover 111 and third cover 153, and second cover 112 and fourth cover 154 do not rub against each other. Therefore, even if charging stand 101 is placed on a washstand or the like without being fixed, care apparatus 105 can be removed from charging stand 101 without holding down of charging stand 101 with a hand or the like. As a result, care apparatus 105 can be easily removed from charging stand 101 while being held by a hand, and care apparatus 105 can be easily used. In addition, after a use of care apparatus 105, care apparatus 105 can be easily attached to charging stand 101 to start charging of care apparatus 105.

Fifth terminal 135 is a terminal that is attached to a position of charging stand 101 different from first terminal 121 or second terminal 122 and is electrically connected to first terminal 121 inside charging stand 101. Sixth terminal 136 is a terminal that is aligned with fifth terminal 135 near fifth terminal 135 and is electrically connected to second terminal 122. A shape of each of fifth terminal 135 and sixth terminal 136 is not particularly limited. In the case of the present exemplary embodiment, fifth terminal 135 and sixth terminal 136 each are a round rod similar to third terminal 163 and fourth terminal 164. Fifth terminal 135 and first terminal 121, and sixth terminal 136 and second terminal 122 are electrically connected, respectively, through a lead wired inside charging stand 101. Extending directions of axes of fifth terminal 135 and sixth terminal 136 are parallel to the axes of biasing directions (X-axis in the drawing) of first terminal 121 and second terminal 122, respectively. In addition, protruding directions of fifth terminal 135 and sixth terminal 136 extend from the end of the opposite side of the side where guide 113 is provided toward the end where guide 113 is provided (positive direction of the X-axis in the drawing). Attachment positions of fifth terminal 135 and sixth terminal 136 are not specifically limited. In the case of the present exemplary embodiment, fifth terminal 135 and sixth terminal 136 are attached to a side wall of recess 109 recessed toward holding surface 110 on a surface on an opposite side of holding surface 110 that holds care apparatus 105. Fifth terminal 135 and sixth terminal 136 are aligned in an axis direction extending from holding surface 110 of charging stand 101 toward a surface on an opposite side (Z-axis in the drawing).

Fifth cover 125 is a portion having a tubular shape that stores at least a part of fifth terminal 135. Sixth cover 126 is a portion having a tubular shape that stores at least a part of sixth terminal 136. Fifth cover 125 and sixth cover 126 form a shape of third connecting portion 173 serving as an input connecting portion connectable to power supply connecting portion 202. Moreover, the shape of third connecting portion 173 is different from a shape of first connecting portion 171 serving as an output connecting portion formed by first cover 111 and second cover 112. Furthermore, the shape of third connecting portion 173 is different from a shape of second connecting portion 172.

In the case of the present exemplary embodiment, the shape of third connecting portion 173 formed by an inner shape of fifth cover 125 and an inner shape of sixth cover 126 is different from the shape of first connecting portion 171 formed by the outer shape of first cover 111 and the outer shape of second cover 112. In the case of the present exemplary embodiment, the shape of third connecting portion 173 formed by the inner shape of fifth cover 125 and the inner shape of sixth cover 126 is different from the shape of second connecting portion 172 formed by the inner shape of third cover 153 and the inner shape of fourth cover 154.

More specifically, a spacing between an axis of the outer shape of first cover 111 and an axis of the outer shape of second cover 112 is set to be larger than a spacing between an axis of the inner shape of fifth cover 125 and an axis of the inner shape of sixth cover 126. Moreover, a spacing between an axis of the inner shape of third cover 153 and an axis of the inner shape of fourth cover 154 is set to be larger than the spacing between the axis of the inner shape of fifth cover 125 and the axis of the inner shape of sixth cover 126. Accordingly, a spacing between first terminal 121 and second terminal 122 is larger than a spacing between fifth terminal 135 and sixth terminal 136. Moreover, a spacing between third terminal 163 and fourth terminal 164 is larger than the spacing between fifth terminal 135 and sixth terminal 136. As a result, power supply connecting portion 202 that is connected to fifth cover 125 and sixth cover 126 cannot be connected to third cover 153 and fourth cover 154 that are connected to first cover 111 and second cover 112, respectively.

Moreover, first partition wall 162 of second connecting portion 172 is higher than second partition wall 138 of third connecting portion 173. In this respect, the shape of second connecting portion 172 is different from the shape of third connecting portion 173. As a result, an erroneous connection of power supply connecting portion 202 can be more effectively prevented. Note that a height of first partition wall 162 is desirably greater to or equal to a height of third terminal 163 and fourth terminal 164, and a height of second partition wall 138 is desirably greater than or equal to a height of fifth terminal 135 and sixth terminal 136. This is because the heights described above can further reduce a possibility of a short circuit or electric erosion due to water.

As described above, shapes of first cover 111 and third cover 153, and shapes of second cover 112 and fourth cover 154 have a relationship in which gap C is formed so that care apparatus 105 can be removed from charging stand 101 with one hand without holding down of charging stand 101 with a hand or the like. On the other hand, shapes of fifth cover 125 and sixth cover 126 can have a relationship so as to be firmly connected to power supply connecting portion 202 provided at a tip end of power supply cable 201. Moreover, power supply connecting portion 202 cannot be directly connected to care apparatus 105.

Fifth cover 125 and sixth cover 126 are provided such that fifth cover 125 and sixth cover 126 open facing an inside of recess 109 recessed toward holding surface 110 from a surface on an opposite side of holding surface 110. As described above, since fifth cover 125, sixth cover 126, fifth terminal 135, and sixth terminal 136 are disposed in recess 109, the connecting portion with power supply connecting portion 202 can be concealed. Even in a case where a liquid such as water is poured upon charging stand 101 from above, entering of the liquid into fifth cover 125 and sixth cover 126 to which power supply connecting portion 202 is connected can be prevented.

Moreover, charging stand 101 includes side surface opening 137 formed of an opening of a part of a side wall of recess 109, and openings of fifth cover 125 and sixth cover 126 are provided on the side wall of recess 109 so as to face side surface opening 137. Therefore, along an axis of a direction in which power supply connecting portion 202 is inserted into fifth cover 125 and sixth cover 126, fifth cover 125, sixth cover 126, and side surface opening 137 are aligned on a straight line. As a result, even if recess 109 is small, power supply connecting portion 202 can be reliably attached to or detached from fifth cover 125 and sixth cover 126 by hand. As a result, even in a case where a structure in which a high frictional force is generated between power supply connecting portion 202 and fifth cover 125 and sixth cover 126 is adopted, power supply connecting portion 202 can be reliably attached to charging stand 101 by hand. Moreover, this configuration can prevent power supply connecting portion 202 from unintentionally coming off charging stand 101.

Fifth cover 125 and sixth cover 126 are disposed so as to be vertically aligned when charging stand 101 is placed on a washstand or the like. As a result, even in a case where a liquid such as water enters fifth cover 125 and sixth cover 126, the liquid can be prevented from being attached, in a crosslinked manner, to fifth terminal 135 and sixth terminal 136 that are stored in fifth cover 125 and sixth cover 126, respectively. As a result, even when fifth cover 125 and sixth cover 126 are vertically interlocked, fifth terminal 135 and sixth terminal 136 can be prevented from corroding due to electrolysis. In addition, an excess space is provided on right and left sides of fifth cover 125 and sixth cover 126 that are vertically aligned. Since the excess space is provided, in recess 109, power supply connecting portion 202 can be easily taken out from and put into recess 109 while being pinched with fingers.

According to charging stand 101 according to exemplary embodiment described above, fifth cover 125 and sixth cover 126 can correspond to a shape of general-purpose power supply connecting portion 202. As the same time, a shape of each of first cover 111 and second cover 112 that are connected to care apparatus 105 can be set for each type of care apparatus 105 through, for example, being formed into a shape suitable to drain water. As a result, an effect suitable for the type of care apparatus 105 can be achieved such as prevention of corrosion of first terminal 121 and second terminal 122, due to electrolysis, provided on holding surface 110 of charging stand 101.

Moreover, since recess 109 is provided at the bottom of charging stand 101, and fifth cover 125 and sixth cover 126 are disposed so as to face recess 109, power supply connecting portion 202 can be stored inside charging stand 101. As a result, the connecting portion with power supply connecting portion 202 can be concealed with charging stand 101, and entering of a liquid into fifth cover 125 and sixth cover 126 can be suppressed. Moreover, charging stand 101 as a whole including connected power supply connecting portion 202 can be downsized, and thus an installation area of care unit 100 can be reduced.

Note that the present disclosure is not limited to the exemplary embodiment described above. For example, a different exemplary embodiment implemented by arbitrarily combining constituents described herein or excluding some of the constituents may be adopted as the exemplary embodiment of the present disclosure. In addition, the present disclosure includes modifications obtained by adopting various modifications which are conceivable by those skilled in the art for the exemplary embodiment described above within the scope not departing from the gist of the present disclosure, that is, the meaning of the description in the scope of the claims.

For example, charging stand 101 not only relays power, but may include an electronic part such as a voltage lowering circuit and a direct current conversion circuit.

In the exemplary embodiment described above, an example of the shape of each of first cover 111, second cover 112, third cover 153, fourth cover 154, fifth cover 125, and sixth cover 126 is shown. Alternatively, each shape may be arbitrarily combined within a range in which first cover 111 and second cover 112 can be detachably connected to third cover 153 and fourth cover 154, respectively, and fifth cover 125 and sixth cover 126 can be detachably connected to power supply connecting portion 202.

The case where first terminal 121 and second terminal 122 are provided in charging stand 101 and third terminal 163 and fourth terminal 164 are provided in care apparatus 105 has been described. Alternatively, first terminal 121 and fourth terminal 164 may be included in charging stand 101, and second terminal 122 and third terminal 163 may be included in care apparatus 105.

Alternatively, the shape of each of first cover 111, second cover 112, third cover 153, fourth cover 154, fifth cover 125, and sixth cover 126 is not limited to a quadrangular pyramid, and an arbitrary shape such as a truncated cone can be applied.

The present disclosure can be applied to a charging stand that charges a compact care apparatus including a storage battery.

What is claimed is:

1. A charging stand for a care apparatus, the charging stand comprising:
a first terminal and a second terminal, wherein the charging stand supplies power to the care apparatus through detachable connection between the first terminal and a third terminal that is at least partially stored in a third cover included in the care apparatus, and between the second terminal and a fourth terminal that is at least partially stored in a fourth cover included in the care apparatus;
a fifth terminal that is electrically connected to the first terminal;
a sixth terminal that is aligned with the fifth terminal and is electrically connected to the second terminal;
a first cover that stores at least a part of the first terminal;
a second cover that stores at least a part of the second terminal;
a fifth cover that stores at least a part of the fifth terminal; and
a sixth cover that stores at least a part of the sixth terminal, wherein
a shape of an input connecting portion formed by the fifth cover and the sixth cover is a shape connectable to a power supply connecting portion, and is different from a shape of an output connecting portion formed by the first cover and the second cover.

2. The charging stand for a care apparatus according to claim 1, wherein a spacing between the first cover and the second cover is larger than a spacing between the fifth cover and the sixth cover.

3. The charging stand for a care apparatus according to claim 1, further comprising a holding surface having a flat shape that holds the care apparatus,
wherein the first cover and the second cover protrude from the holding surface.

4. The charging stand for a care apparatus according to claim 1, further comprising:
a holding surface having a flat shape that holds the care apparatus; and
a recess recessed toward the holding surface on a surface on a side opposite to the holding surface,
wherein the fifth cover and the sixth cover are provided to allow openings of the fifth cover and the sixth cover to face an inside of the recess.

5. The charging stand for a care apparatus according to claim 4, wherein
the recess includes a side surface opening formed of an opening of a part of a side wall of the recess, and
the openings of the fifth cover and the sixth cover face the side surface opening.

6. The charging stand for a care apparatus according to claim 4, wherein the fifth cover and the sixth cover are vertically disposed.

7. The charging stand for a care apparatus according to claim 1, wherein each of the first cover, the second cover, the fifth cover and the sixth cover has a tubular shape.

* * * * *